June 7, 1960
F. C. SHOVIC
2,939,321
CURVE TRANSLATOR
Filed Dec. 19, 1956
3 Sheets-Sheet 1
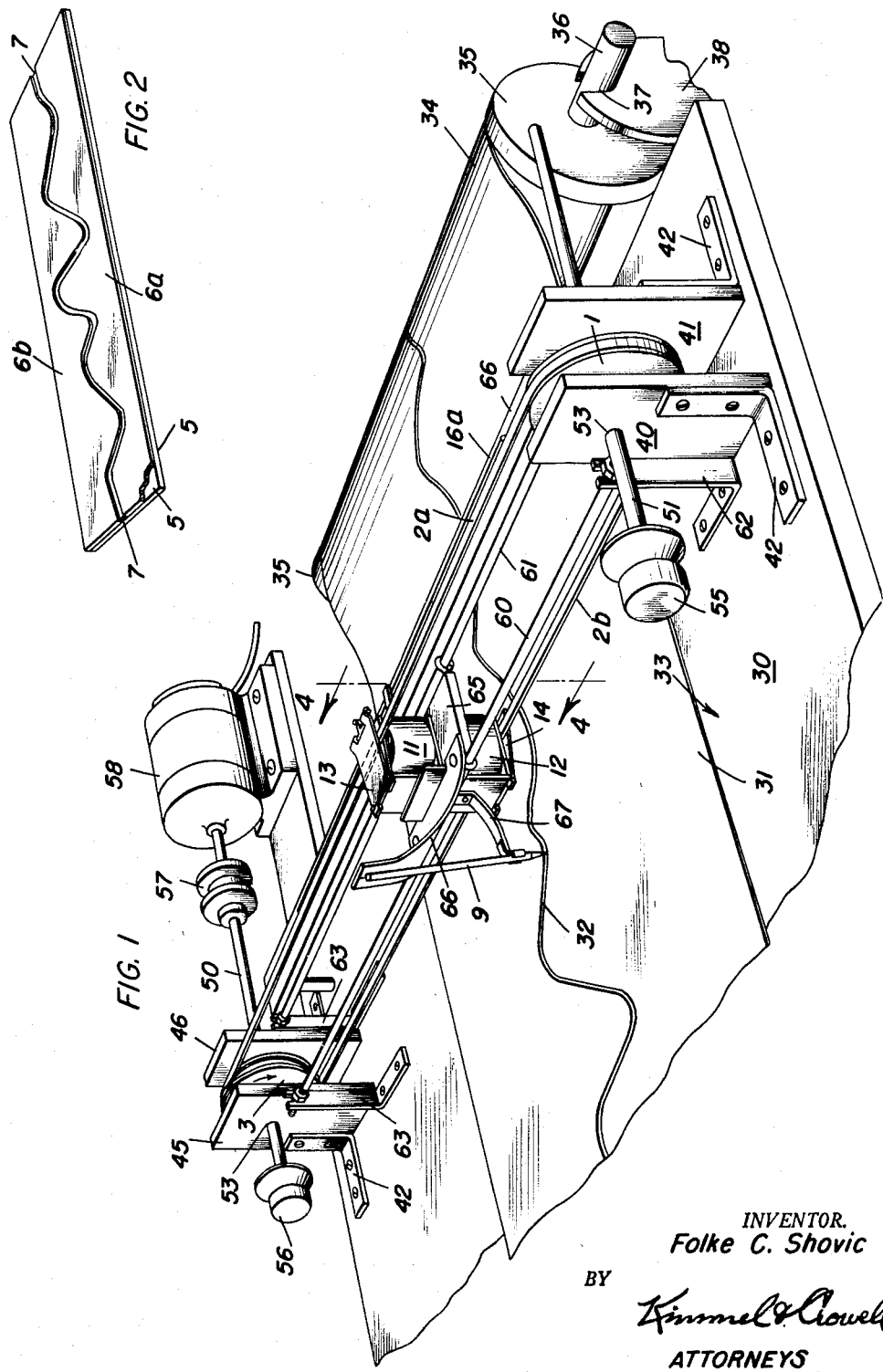
INVENTOR.
Folke C. Shovic
BY
Kimmel & Crowell
ATTORNEYS

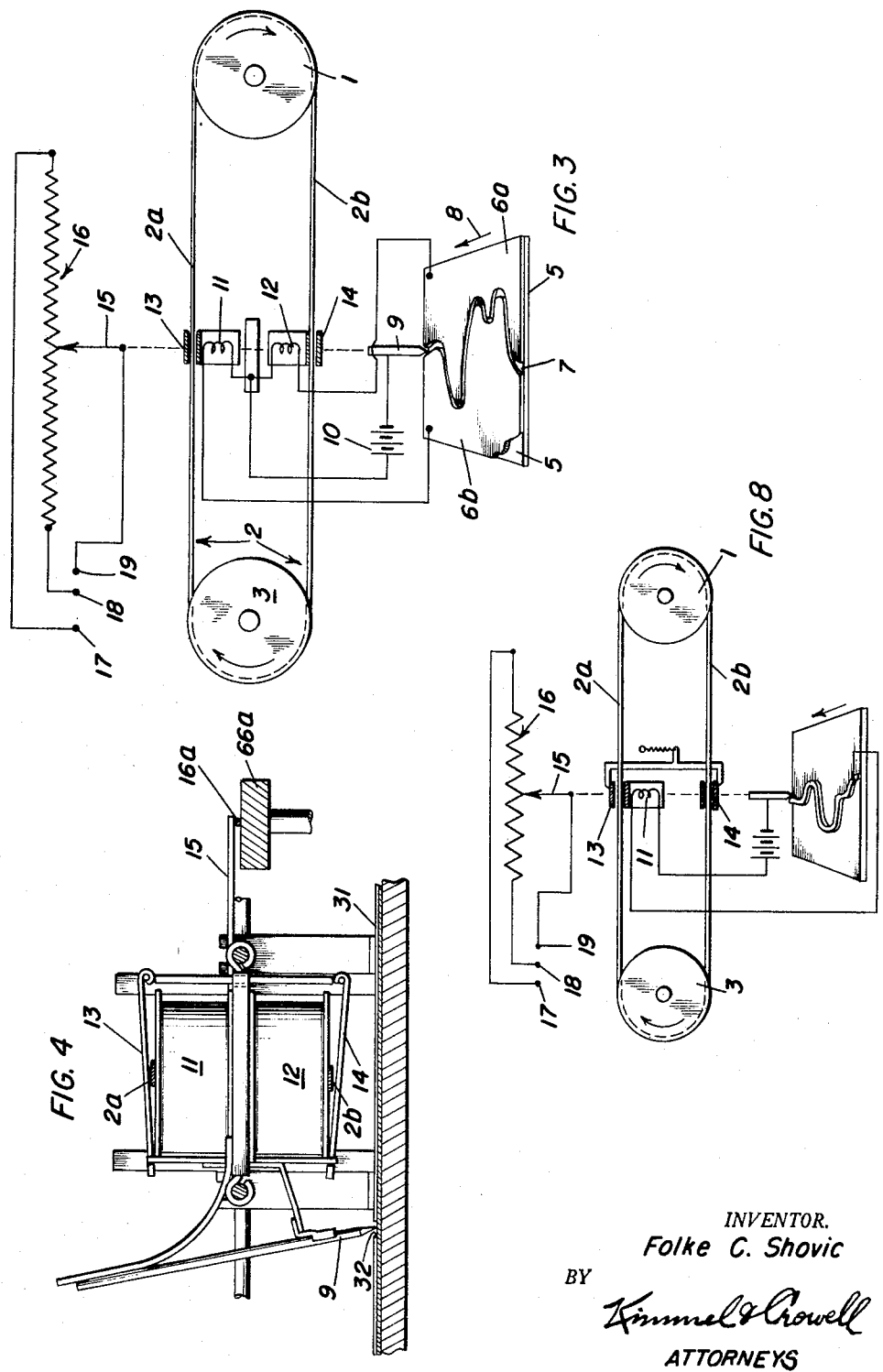

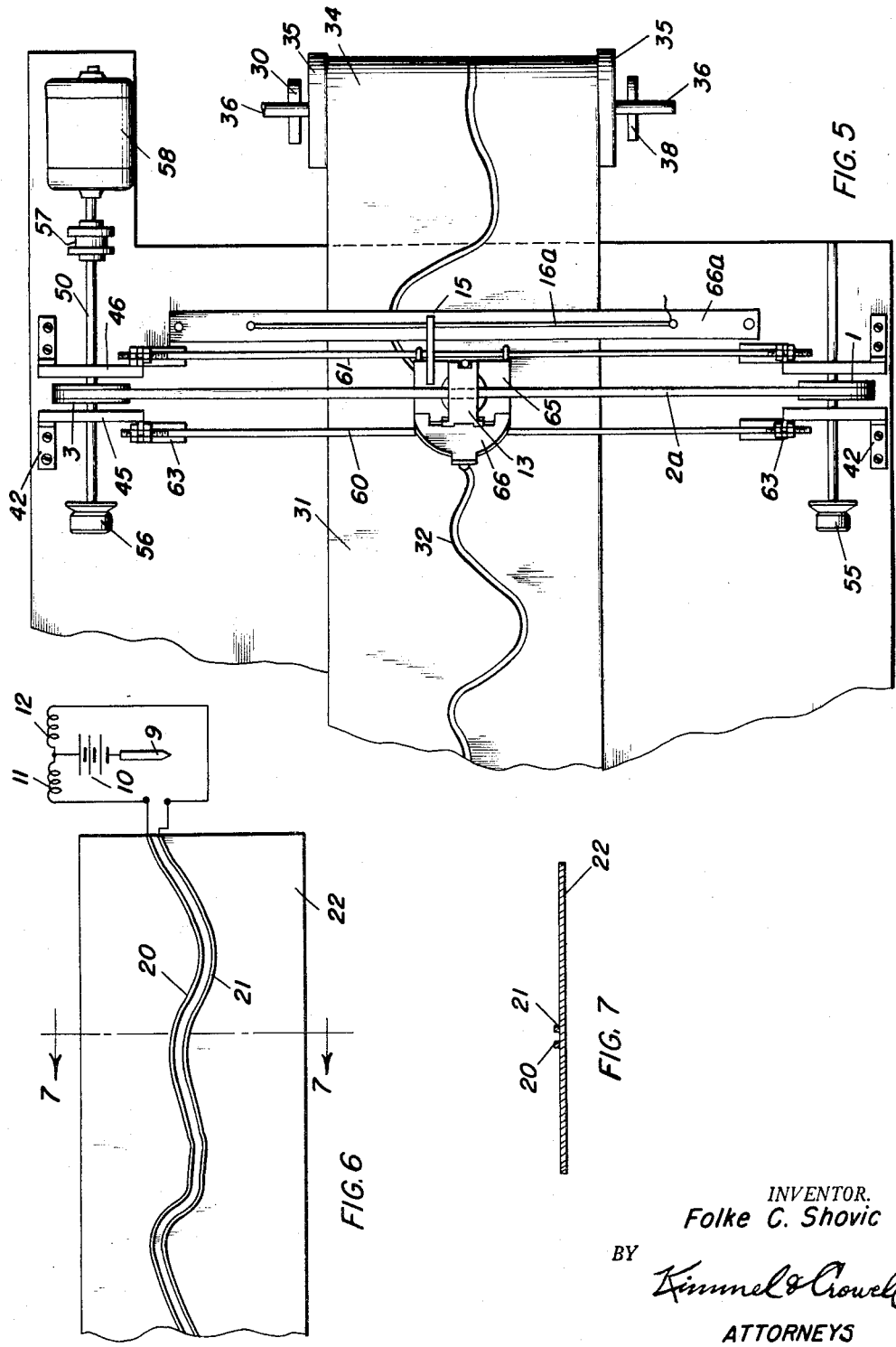

United States Patent Office 2,939,321
Patented June 7, 1960

2,939,321

CURVE TRANSLATOR

Folke C. Shovic, Great Falls, Mont., assignor of twenty-five percent to John P. Wuerthner, Great Falls, Mont.

Filed Dec. 19, 1956, Ser. No. 629,326

9 Claims. (Cl. 74—1)

The present invention relates generally to a curve translator, function generator and control system and more particularly to a system for controlling the position of a positionable element in correspondence with a graphic representation of a mathematical or nonmathematical function.

In the art of analog computers it has been usual to incorporate devices for generating time varying voltages representing desired mathematical functions. In control systems, such as systems for controlling the position of a cutting tool or work piece in the machine tool art and generally in the art of controllably positioning movable objects, it has been known to effect such control by following a graphic representation, or a contour representing curve. In recorders it is frequently desired to cause one recording element, such as a chart or a stylus, to be displaced in accordance with a predetermined function, or in accordance with a predetermined mathematical law or form. Such systems require, as an element of primary importance, a device which may be denominated "curve follower" or "graph tracer," and which includes motor means for actuating a mechanical device to desired final positions by means of control elements and circuits electrically controlled by a graph or curve.

It is a primary object of the present invention to provide a novel curve follower or graph tracer.

It is a more specific object of the present invention to provide a curve follower or tracer, in which a movable mechanical element may be translated in response to an electric motor which rotates continuously in one direction, and which is not controlled per se.

A further object of the invention resides in the provision of a curve follower in which a mechanical device is caused to assume positions corresponding with successive ordinates of a curve, by coupling the device controllably and selectively to parts of a belt drive having opposite directions of travel.

A further object of the invention is to provide a novel electro-magnetic clutching system for achieving positive two-way motion selectively in response to rotation of a motor in a single direction.

It is another object of the invention to provide a system for moving a mechanical element at will in one of two opposite directions, by securing the element detachably to appropriate parts of a continuous belt, which is continuously driven in one direction.

The above and still further objects, features and advantages of the present invention will become apparent upon consideration of the following detailed description of one specific embodiment thereof, especially when taken in conjunction with the accompanying drawings, wherein:

Figure 1 is a view in perspective of a system according to the invention;

Figure 2 is a view in perspective of a first form of control element, in the form of a groove between two conductive surfaces, which may be employed to control the system of Figure 1;

Figure 3 is a simplified schematic representation of the system of Figure 1, as applied in the field of function generation, and indicating suitable electrical circuits for employment in the system;

Figure 4 is an enlarged view taken on the line 4—4 of Figure 1;

Figure 5 is a plan view of a system corresponding generally to that of Figure 1;

Figure 6 is a view in plan of a second form of control element which may be employed in the present system in place of that of Figure 2;

Figure 7 is a view in section taken on the line 7—7 of Figure 6; and

Figure 8 is a schematic representation of a modification of the system of Figure 3.

Referring now more particularly to the accompanying drawings, and particularly to Figure 3 thereof, the reference numeral 1 denotes a pulley driven from a motor, not shown, in a clock-wise sense. A belt 2 extends over pulley 1, and over an idler pulley 3, the belt being fabricated of any desired material, such as metal, fabric, plastic, leather or the like. It is preferred that the belt be non-conductive, since this avoids certain problems of providing insulation, but this is not essential.

The upper length 2a of belt 2 moves to the right, as seen in Figure 3, and the lower length 2b moves to the left.

A sheet of insulating material 5 is provided with a coating or layer of metal 6a, 6b, which is grooved as at 7 to the underlying insulation. The insulating groove 7 then constitutes a curve or graph which is to be followed, and constitutes a dividing groove between the two relatively insulated metallic layers, 6a and 6b. The plate 5 is made movable in the direction of the arrow 8, relative to a stationary conductive stylus 9.

A source of power 10, indicated schematically as a battery, but which may in fact be an A.C. source, has one terminal connected to stylus 9 and the remaining terminal connected in parallel to two relay coils 11 and 12. The relay coil 11 is connected back to the conductive layer 6b and the relay coil 12 back to the conductive layer 6a. It follows that if the stylus 9 is in the groove 7, both relay coils, 11 and 12, are de-energized. If the stylus 9 contacts the layer 6a, the relay coil 12 alone will be energized; while if the stylus 9 contacts the layer 6b, the relay coil 11 alone will be energized.

When relay coil 11 is energized, its armature 13 clamps belt section 2a, the latter normally riding free of the armature 13. Similarly, when relay coil 12 is energized, its armature 14 clamps belt section 2b, which normally rides free of armature 14. Stylus or curve follower 9 is rigidly secured to armatures 13 and 14, and these to each other.

It follows that, in operation, the stylus or curve follower 9 follows the groove 7, since if the stylus 9 contacts layer 6a, relay coil 12 is energized, and clutches the stylus 9 to belt section 2b. The belt section 2b moves to the left, as seen in Figure 3, and accordingly moves the stylus toward groove 7. On arrival, the relay coil 12 is de-energized and the motion of stylus 9 ceases. If, on the other hand, stylus 9 contacts layer 6b, the relay coil 11 is energized, armature 13 is clutched to belt section 2a, moving to the right as seen in Figure 3, and the stylus again moves toward groove 7. On arrival the energizing circuit for relay coil 11 is broken, the armature is declutched, and motion of the stylus ceases.

The stylus 9, or the carriage on which it may be mounted, may be employed to move the slider 15 of a potentiometer or voltage divider 16. The resistance of the latter is supplied with voltage from two terminals 17, 18 so that the slider 15 varies in potential according to its position. The potential of the slider 15 may be derived at a terminal 19.

While the system of Figure 3 employs two continuous conductive layers 6a, 6b, separated by a groove 7, this is not required. The stylus 9 will normally follow the groove 7 so that all of the layers 6a, 6b except the portions adjacent to the groove is unnecessary. In Figures 6 and 7 of the accompanying drawings, I have illustrated a control card or sheet in which the layers 6a, 6b are replaced by parallel wires or other conductors 20, 21, spaced from each other slightly, and cemented to an insulating base 22. Operation of a system employing the control sheet of Figures 6, 7 is precisely the same as that of the system of Figure 3, except that if the stylus 9 should, in any unusual set of circumstances, lose contact with the conductors or wires 20, 21 while not subsisting therebetween, operation of the system would be inaccurate and faulty. The system of Figure 3 is in this respect completely safe.

Still a further modification of the basic system is provided, which is illustrated in Figure 8 of the accompanying drawings. In that figure a single wire is utilized to define a graph or curve to be followed. The relay coil 12 is not used, and its armature 14 is rigidly coupled with armature 13, so that clutching of armature 13 to belt section 2a will serve to de-clutch armature 14, and vice versa, de-clutching of armature 13 will serve to clutch armature 14. It follows that stylus 9 will follow one side of the single wire, since when it loses contact, it will be driven back into contact, and when it makes contact, it will be driven out of contact. The fact that one side of the stylus 9 follows one side or edge of the control wire or curve provides accurate control, automatically, whereas in the systems of Figures 3, and 6, 7, it is required that the spacing between conductors be only slightly greater than the width of the stylus, which then tends to oscillate from one to another of the conductors.

Reference is now made to the structural representations of Figures 1, 4 and 5, which are based on and amplify the disclosure of Figure 3. The structural features illustrated and described may, however, be employed in any of the several modifications and examples of my invention herein described, and illustrated in the accompanying drawings, the required modifications of structure, if any, being obvious and requiring no discussion.

In Figure 1, the reference numeral 30 denotes a flat base, along the center of which travels a control sheet, 31, having thereon a control curve 32. The stylus 9 is to follow the curve 32 as the sheet 31 is driven in the direction of arrow 33, from a supply roll 34. The latter may include end discs 35, which maintain roll 34 in alignment, and oppositely extending pins 36, which ride in open slots 37 in a roll support 38. The sheet 31 may be flexible, and may consist of a thin metallic coating on a flexible plastic base, the coating being deposited in known fashion, as by electro-deposition. Sheets of this kind are commercially available, and groove 32 may be cut therein by removal of the thin coating, in any convenient fashion.

A pair of upright parallel spaced-apart standards 40, 41 is secured in any convenient fashion to the base plate 30, as by brackets 42, adjacent one edge thereof. Similar standards 45, 46 are secured adjacent the other edge of base plate 30, in similar fashion, standards 40, 45 being in the same vertical plane, and standards 41, 46 being also in the same vertical plane. Pulley 3 is supported between standards 45, 46 on a pin 50, and pulley 1 is supported between standards 40, 41 on a pin 51. The pulleys, in each case, rotate with the pins, and apertures 53 are provided in the standards as bearing elements for the pins 50, 51.

The pin 51 is provided with a knob 55, at one end, to permit manual manipulation. The pin 50 is likewise provided with a knob 56, at one end to permit manual manipulations, but is additionally coupled by a coupling element 57 with a drive motor 58, which drives the pulley 3 clockwise, as viewed in Figure 1. The belt 2, consisting of an upper section 2a moving to the right, and a lower section 2b moving to the left, as seen in Figure 1, extends over the pulleys, pulley 3 acting as a drive pulley and pulley 1 as an idler pulley. Obviously, either pulley may in fact be used as a drive pulley.

A pair of parallel rails 60, 61 extend parallel with and midway between the pulley sections 2a and 2b, the rails extending between standards 40, 45, and 41, 46, and being supported on suitable brackets 62, 63.

Riding on the rails 60, 61 is a carriage 65, to which is secured the stylus or curve follower 9, by means of arms 66, 67 extending generally forwardly of carriage 65, and the relay coils 11, 12, having armatures 13, 14, respectively. It may be noted that the armature 13 overlies the belt section 2a, which in turn overlies the body of the relay, and that armature 14 lies under and in proximity to the belt section 2b, which in turn lies under the relay structure of coil 12. It follows that energization of coil 11 serves to clamp belt section 2a between armature 13 and the body of its associated relay structure, while energization of coil 12 serves to clamp belt section 2b between armature 14 and its associated relay structure. Since the relays are rigidly mounted on carriage 65, and the belt sections 2a, 2b travel in opposite directions, the carriage 65, and the stylus or curve follower 9, may be caused to translate in one direction or the other accordingly as relay coil 11 or relay coil 12 is energized.

The resistance 16 (Figure 3) is physically embodied in a slide-wire 16a, mounted on a table 66a, and slider 15 is secured to carriage 65 and moves therewith, over the length of slide-wire 16a.

If the stylus 9 is to track a curve 32 which has sharp or rapid changes of directions, it is required that the transverse speed of motion of the carriage 65 be greater than the longitudinal speed of motion of the control sheet 31. It will be clear that rigid code plates, containing desired curves, may be substituted for the flexible sheet 31 (see Figure 2) the principles of my invention centering on the nature of the carriage drive rather than on the specific physical form which the control curve may take.

The analogue voltage functions available at terminal 19 (Figure 3) may be employed for a wide variety of uses, as in computers, control systems of electrical or hydraulic nature, and the like, which will readily suggest themselves to those skilled in the art.

The whole assembly can be strengthened or "beefed" up, and then the carriage 65 can be connected directly to control surfaces of a moving object and will, by virtue of novel construction, greatly simplify a guidance scheme involving phases of plane or solid geometry.

While I have described and illustrated one specific embodiment of my invention, it will be clear that variations of the general arrangement and of the details of construction which are specifically illustrated and described may be resorted to without departing from the true spirit and scope of the invention as defined in the appended claims.

What I claim is:

1. A control system for use in an automatic curve follower adapted to track the boundary between conductively distinguishable parts of a control surface, said boundary defining said curve, comprising a motor rotating in a single direction, a continuous belt driven by said motor always in one sense, said belt having two substantially parallel portions which travel in opposite directions, respectively, a carriage, electro-magnetic clutch means for selectively clutching said carriage to one or the other of said two substantially parallel portions of said belt, a conductive curve follower, and circuit means responsive to the spatial relation of said conductive curve follower to said curve for selectively energizing said electro-magnetic clutch member to clutch said carriage to one or the other of said portions of said belt.

2. The combination according to claim 1 wherein said electro-magnetic clutch means includes two belt clamping elements, and an electro-magnetic device for selectively actuating said two belt clamping elements into clamping relation to said belt.

3. The combination according to claim 2 wherein each of said clamping elements includes a relay armature, and wherein said electro-magnetic device includes two actuating coils, one for actuating one of said armatures and the other for actuating the other of said armatures.

4. The combination according to claim 2 wherein said each of said clamping elements includes a relay armature, means rigidly interconnecting said armatures for simultaneous actuation, and a single relay coil for actuating both said armatures oppositely.

5. The combination according to claim 1 wherein said control surface includes two extensive electrically conductive portions separated by an electrically non-conductive portion, the latter constituting said curve.

6. The combination according to claim 1 wherein said curve includes a pair of parallel separated conductive elements, mounted on an insulating surface.

7. The combination according to claim 1 wherein said curve is a single conductive element.

8. The combination according to claim 1 wherein said curve is one edge of a conductive surface.

9. The combination according to claim 1 wherein said curve is an insulating element dividing an otherwise conductive surface into two insulated portions.

References Cited in the file of this patent

UNITED STATES PATENTS

| | | |
|---|---|---|
| 1,469,470 | Wright | Oct. 2, 1923 |
| 1,582,107 | Whiteside | Apr. 27, 1926 |
| 1,689,849 | Aspinwald | Oct. 30, 1928 |
| 2,474,755 | Pamphilon | June 28, 1949 |
| 2,588,386 | Hubbard | Mar. 11, 1952 |
| 2,679,622 | Deri | May 25, 1954 |
| 2,744,224 | Bode | May 1, 1956 |
| 2,744,225 | Rorden | May 1, 1956 |
| 2,824,460 | Davis | Feb. 25, 1958 |

FOREIGN PATENTS

| | | |
|---|---|---|
| 149,104 | Great Britain | Aug. 12, 1920 |